United States Patent
Von Keitz

(10) Patent No.: US 9,435,475 B2
(45) Date of Patent: Sep. 6, 2016

(54) LOW-TEMPERATURE CONDUIT COUPLING

(71) Applicant: Andreas Von Keitz, Dietz (DE)

(72) Inventor: Andreas Von Keitz, Dietz (DE)

( * ) Notice: Subject to any disclaimer, the term of this patent is extended or adjusted under 35 U.S.C. 154(b) by 0 days.

(21) Appl. No.: 14/407,359

(22) PCT Filed: Jun. 5, 2013

(86) PCT No.: PCT/EP2013/061597
§ 371 (c)(1),
(2) Date: Dec. 11, 2014

(87) PCT Pub. No.: WO2013/186100
PCT Pub. Date: Dec. 19, 2013

(65) Prior Publication Data
US 2015/0114500 A1    Apr. 30, 2015

(30) Foreign Application Priority Data
Jun. 11, 2012    (DE) .................. 10 2012 104 990

(51) Int. Cl.
| | | |
|---|---|---|
| *F16L 37/30* | (2006.01) | |
| *F16L 29/04* | (2006.01) | |
| *F16L 39/04* | (2006.01) | |
| *F16L 17/025* | (2006.01) | |
| *F16L 25/06* | (2006.01) | |
| *F16J 15/00* | (2006.01) | |

(52) U.S. Cl.
CPC ................ *F16L 39/04* (2013.01); *F16J 15/00* (2013.01); *F16L 17/025* (2013.01); *F16L 25/06* (2013.01); *F16L 37/30* (2013.01); *Y10T 137/87949* (2015.04)

(58) Field of Classification Search
CPC ...... F16L 37/248; F16L 37/252; F16L 29/04; F16L 37/30
USPC ........................... 137/614.03–614.05
See application file for complete search history.

(56) References Cited

U.S. PATENT DOCUMENTS

| | | |
|---|---|---|
| 597,549 A | 1/1898 | Stanley |
| 1,812,038 A | 6/1931 | Davis |
| 1,996,900 A | 4/1935 | Buckner |
| 3,112,766 A * | 12/1963 | Zeliznak et al. ...... F16L 37/252 137/614.05 |
| 3,842,614 A | 10/1974 | Karcher et al. |
| 5,265,890 A | 11/1993 | Balsells et al. |
| 5,363,879 A | 11/1994 | Rhoades |

(Continued)

FOREIGN PATENT DOCUMENTS

| | | |
|---|---|---|
| CN | 101371067 A | 2/2009 |
| CN | 201688068 U | 12/2010 |

(Continued)

OTHER PUBLICATIONS

International Search Report dated Sep. 30, 2013 for Corresponding PCT/EP2013/061597 with English translation, 8 pages.

(Continued)

*Primary Examiner* — Kevin Lee
(74) *Attorney, Agent, or Firm* — Ohlandt, Greeley, Ruggiero & Perle, LLP

(57) ABSTRACT

A conduit coupling for low temperature applications includes two coupling halves that are equipped with a poppet valve and a stem-actuated valve, respectively, so as to open during a coupling process. The stem-actuated valve has a piston that seals by way of a spreading lip seal.

14 Claims, 4 Drawing Sheets

(56) References Cited

U.S. PATENT DOCUMENTS

| | | | |
|---|---|---|---|
| 7,117,892 B2* | 10/2006 | Krywitsky | F16L 37/244 |
| | | | 137/614.04 |
| 8,397,755 B2* | 3/2013 | Takami | F16K 15/00 |
| | | | 137/614.04 |
| 2004/0050450 A1 | 3/2004 | Lambert et al. | |
| 2006/0022464 A1 | 2/2006 | Lambert et al. | |

FOREIGN PATENT DOCUMENTS

| | | |
|---|---|---|
| DE | 4041337 A1 | 6/1992 |
| DE | 19724120 A1 | 12/1998 |
| EP | 0889273 A1 | 1/1999 |

OTHER PUBLICATIONS

German Office Action dated Feb. 18, 2013 for German Patent Application No. 10 2012 104 990.4 with English translation, 7 pages.

Written Opinion of the International Searching Authority dated Sep. 30, 2013 for Corresponding PCT/EP2013/061597 with English translation, 11 pages.

English translation of International Preliminary Report on Patentability dated Dec. 16, 2014 for corresponding PCT/EP2013/061597, 8 pages.

English translation of Chinese Office Action dated Aug. 25, 2015 for corresponding Chinese Patent Application No. 201380024564.2, 10 pages.

* cited by examiner

LOW-TEMPERATURE CONDUIT COUPLING

FIELD OF THE INVENTION

The invention relates to a conduit coupling for connecting a first conduit to a second conduit for the purpose of passing low temperature media therethrough. In particular, liquefied natural gas, liquefied oxygen, argon, ethylene, propylene, ethene and others are considered as media.

BACKGROUND OF THE INVENTION

Conduit couplings commonly include two coupling halves, each of which may be provided with locking means for immediately closing the associated conduit upon disengagement of the coupling in order to prevent the conveyed medium from escaping. Upon coupling, the locking means are released and a flow path between the first and the second conduit is unblocked.

If the media are to be handled at very low temperature with such conduit couplings, then various problems will arise in conjunction with "cold loss" and freezing moisture, also in the form of mist. Heat that penetrates into the conduit system may lead to evaporation of low temperature cooled liquid, thereby causing a substantial pressure. The freezing moisture may cause sluggishness or even freezing of the coupling.

GENERAL DESCRIPTION OF THE INVENTION

Therefore, an object of the invention is to provide a conduit coupling for connecting conduits, which enables to pass even low temperature media while minimizing the problems discussed.

The configuration of the novel conduit coupling should also be suitable for smaller sizes, such as those required for tank trucks or for smaller ships.

The coupling conduit has a first coupling half in the course of the first conduit and a second coupling half in the course of the second conduit, which can be coupled and locked by engaging coupling pins in a coupling groove.

The first coupling half comprises a poppet valve with a spring biased valve disk which rests on a conical valve seat to normally block the passage of the medium through the valve. By applying pressure against the force of the spring, the valve can be pushed open. The interior of the valve is protected against penetrating heat by a thermal barrier coating. The thermal barrier coating may contain polytetrafluoroethylene (PTFE), in order to have good sliding properties for cooperating elements, which is useful even in the case of icing, since ice does not adhere to polytetrafluoroethylene.

The second coupling half comprises a three-part housing, namely an outer tubular jacket housing, an inner valve housing and a bell-shaped drive housing arranged therebetween having a ring portion of a larger diameter and a tubular portion of a smaller diameter. A novel valve is arranged within the valve housing, which can be referred to as a piston valve or stem-actuated valve and whose valve stem extends into the tubular portion of the drive housing and comprises a stem pin there which cooperates with a cam groove of the drive housing. When the coupling halves are coupled with each other, the valve stem can be moved axially by rotating the drive housing, whereby the poppet valve of the first coupling half is pushed open and an axial annular gap on the stem-actuated valve of the second coupling half is opened, so that the medium passage from the first to the second conduit is interconnected.

In the closed position of the valve, the axial annular gap between the valve housing and the valve stem of the second coupling half is sealed by a piston which is formed, besides a piston body, by a (first) spreading lip seal, optionally with the support of an O-ring seal. The spreading lip seal includes an annular sealing body having a sealing lip made of a material that is sufficiently elastic at low temperatures, and an expanding ring spring which presses the sealing lip radially outwards against the wall of the valve housing. In this way, it is ensured that the axial annular gap between the valve housing and the valve stem is sealed even at low temperatures, wherein the axial position of the valve stem is non-critical in terms of sealing in some displacement range of the piston. (This is in contrast to the sealing with a valve disk which has to rest accurately on the conical valve seat in order to seal.)

Polytetrafluoroethylene or a PTFE-containing material or a material with similar properties is preferred as a material of the annular sealing body with sealing lip of the spreading lip seal. Such material is still sufficiently elastic at low temperatures and is easily detached from ice layers that may form on the valve as a result of moisture and under low temperature. In particular composite materials such as a PTFE-graphite material may be used as the PTFE-containing materials.

Wherever there are axial annular gaps in the low temperature conduit coupling, spreading lip seals of the type described above are preferably used. This is the case in the axial annular gap between the protruding end of the valve housing of the second coupling half and the coupling flange of the first coupling half, which surrounds this end. Another location for a spreading lip seal is between the inner flange end of the valve housing and the drive housing encompassing this end. Another spreading lip seal may be arranged in an annular gap between the jacket housing and the drive housing.

The poppet valve of the first coupling half includes a biasing spring which biases the conical sealing element against the conical valve seat. Advantageously, a pressing lip seal made of polytetrafluoroethylene, a PTFE-containing material, or a similar material is applied here.

For moving the valve stem of the stem-actuated valve arranged in the second coupling half to the open and closed positions, a shifting link gear is used which has a helical cam groove and a stem pin engaged therein, which stem pin is mounted on the valve stem which in turn is guided in the axial direction. The cam groove is provided in the drive housing, and the stem pin may comprise a shaft with rollers at the ends thereof. When the coupling halves are coupled and locked to each other, the (previously free) end of the valve housing firmly engages the housing of the poppet valve, and the axial guidance of the stem-actuated valve imposes an axial longitudinal movement to the valve stem, which is generated by the transformation of the rotational movement of the drive housing into a longitudinally translational movement of the valve stem due to the shifting link gear. During its axial longitudinal movement, the valve stem pushes against the poppet valve so as to open it against the force of the biasing spring of the poppet valve. At the same time, during the movement of the valve stem, the entrained spreading lip seal moves out of the annular gap between the valve housing and the stem, the annular gap becomes free and allows the passage of media through both valves.

The interior of both valves may be protected against penetration of heat by means of thermal barrier coatings.

Furthermore, gaps existing between moving parts of the conduit coupling may be provided with a good sliding surface. Polytetrafluoroethylene or, more generally, a PTFE-containing material, such as e.g. a PTFE-graphite composite material is suitable as a material with good sliding properties and for thermal insulation. Moisture condensation is inhibited and icing is easily detached from the surface. In this way, freezing of the conduit coupling is prevented.

BRIEF DESCRIPTION OF THE DRAWINGS

An exemplary embodiment of the invention will now be described with reference to the drawings. In the drawings.

DETAILED DESCRIPTION OF THE PREFERRED EMBODIMENT

Figure 1:
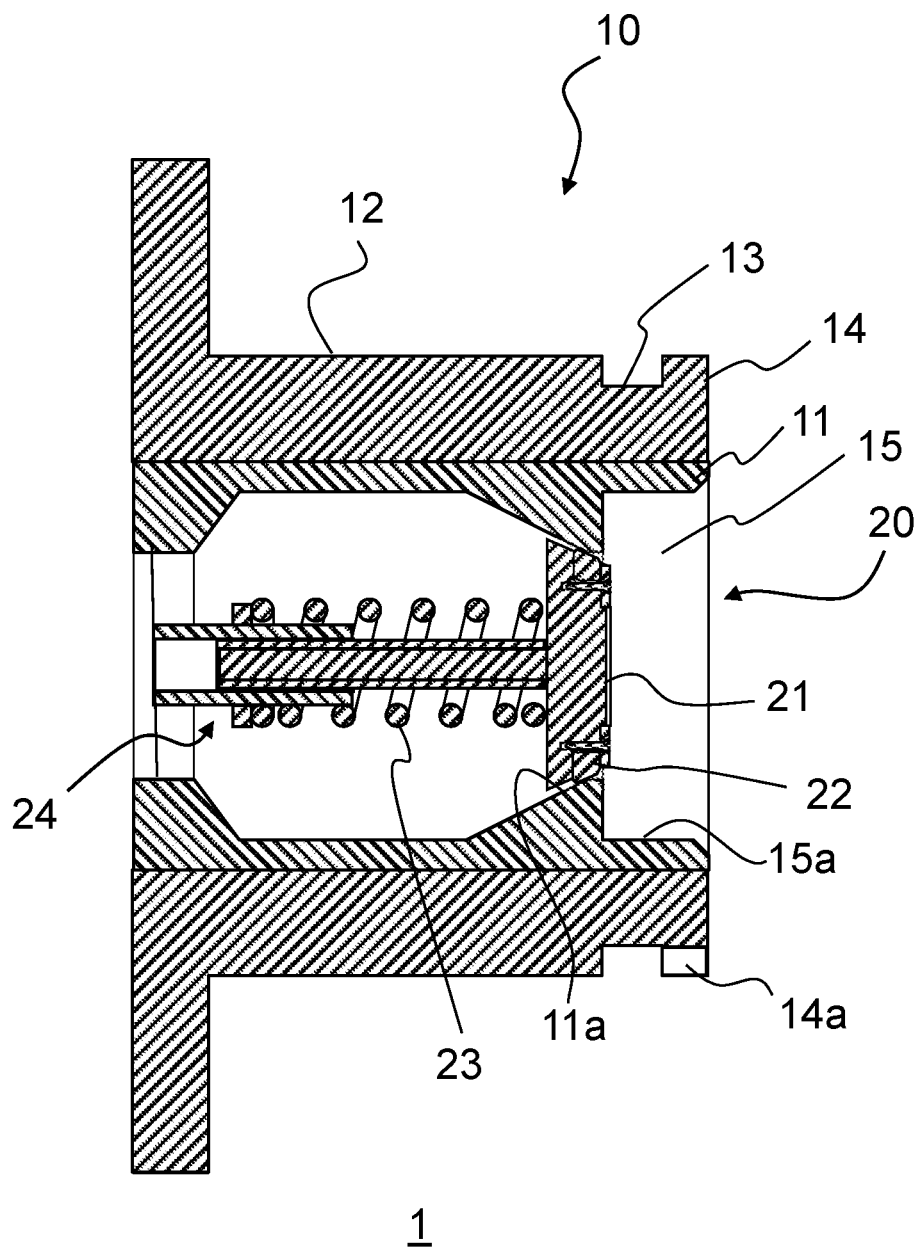
FIG. 1 is a longitudinal sectional view through a first coupling half.
Figure 2:
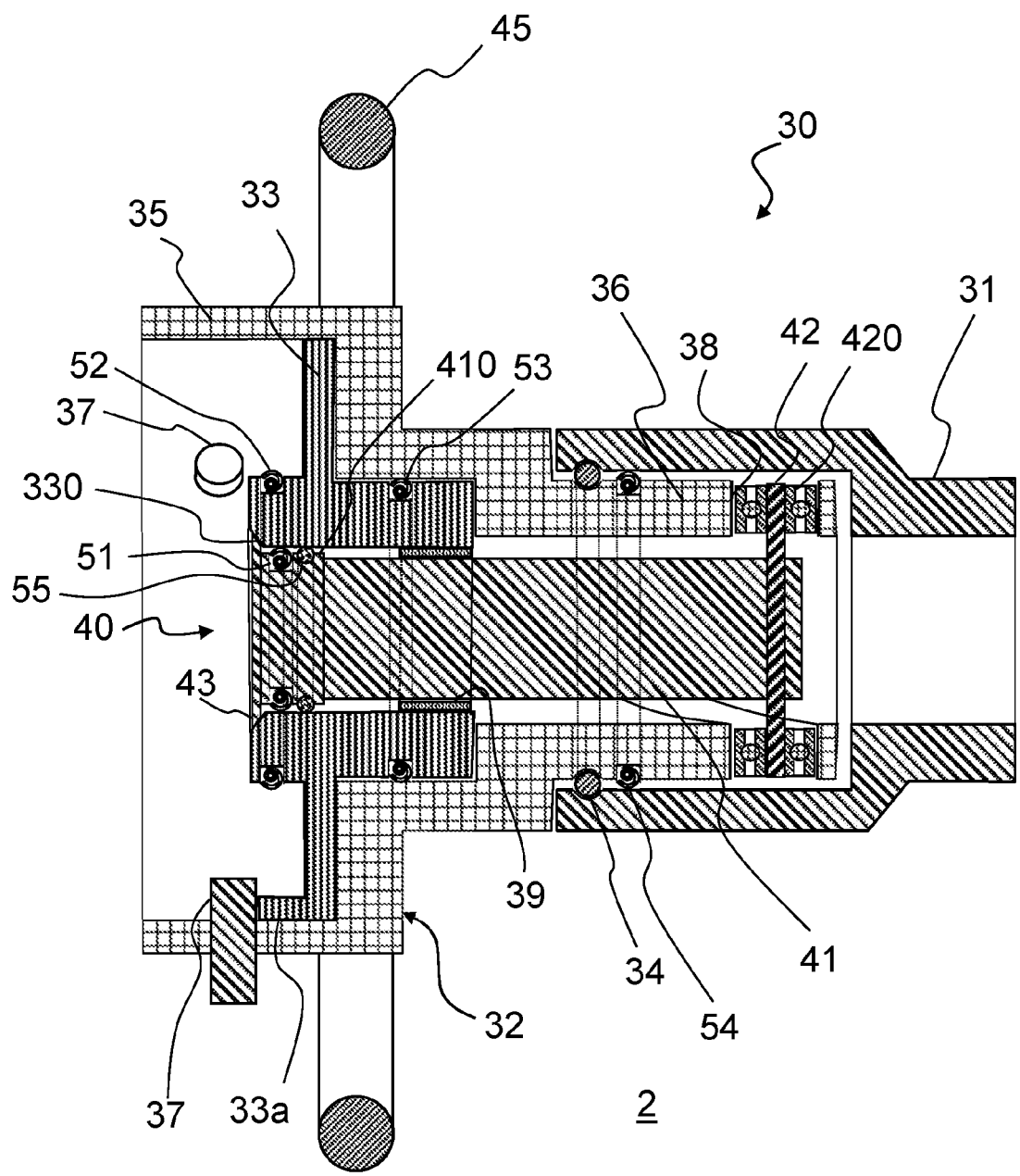
FIG. 2 is a longitudinal sectional view through a second coupling half.
Figure 5:
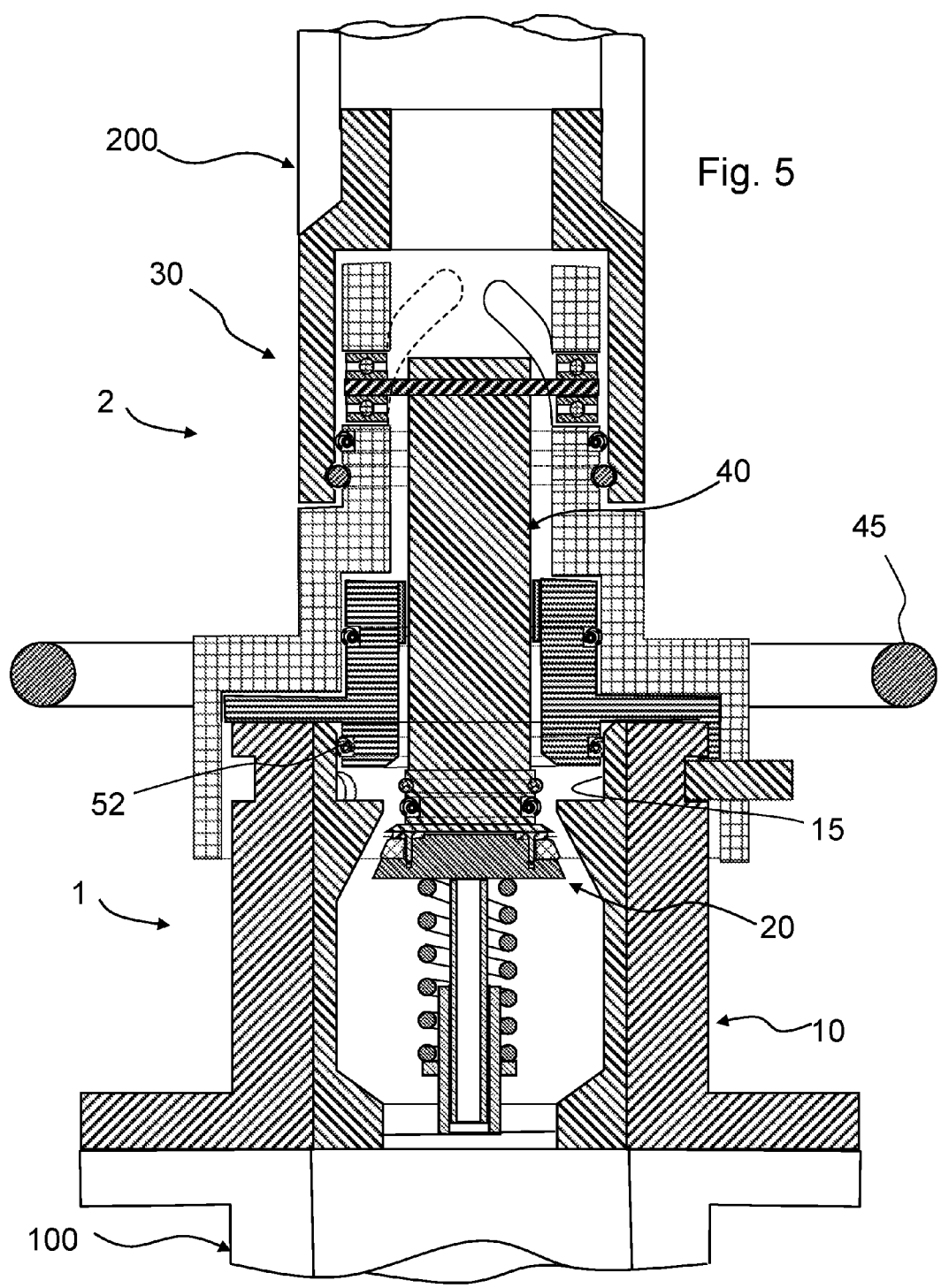
FIG. 5 shows the coupling in the connected valves open position.

The conduit coupling consists of a first coupling half 1 (FIG. 1) and a second coupling half 2 (FIG. 2). A first conduit 100 (FIG. 5) is connected to the first coupling half 1, and a second conduit 200 (FIG. 5) is connected to the second coupling half 2. First coupling half 1 comprises a tubular housing 10 and a poppet valve 20. Second coupling half 2 comprises a three-part housing 30, a piston valve or stem-actuated valve 40 and a hand wheel 45.

Tubular housing 10 of first coupling half 1 comprises a valve seat part 11 which includes a conical valve seat 11a and may be configured as a thermal barrier coating around the interior of the valve, and an outer tube socket 12 which is configured for connection to the first conduit at the left end and for connection to second coupling half 2 at the right end, with a coupling groove 13 and a coupling flange 14. Furthermore, a coupling cavity 15 is provided at the right end of housing 10, which is provided with a good sliding material such as polytetrafluoroethylene or a PTFE-containing material and has a cylindrical inner surface 15a. Poppet valve 20 comprises a valve disk 21 including a conical pressing lip seal 22 which is made of polytetrafluoroethylene, PTFE-containing material or a similar material and is pressed against conical valve seat 11 by a biasing spring 23. A valve guide 24 ensures good axial guidance of valve disk 21.

Housing 30 of second coupling half 2 comprises a tubular jacket housing 31, a bell-shaped drive housing 32, and a valve housing 33, which are onion-like nested within each other. Drive housing 32 is rotatably mounted in jacket housing 31 by means of a ball bearing 34 or another suitable bearing. Jacket housing 31 and drive housing 32 are sealed against each other by means of a spreading lip seal 54. In the illustrated embodiment, spreading lip seal 54 seals the inner surface of jacket housing 31 and the outer surface of drive housing 32 against each other. The bell shape of drive housing 32 is defined by a ring portion 35 of larger diameter and a tubular portion 36 of smaller diameter, which are connected to each other by a disk portion. Ring portion 35 is lined with a friction-reducing material such as polytetrafluoroethylene or a PTFE-containing material such as a PTFE-graphite composite and surrounds valve housing 33. Tubular portion 36 of drive housing 32 is provided with a heat barrier coating which can be formed on the basis of polytetrafluoroethylene. Coupling pins 37 located inside ring portion 35 are introduced into coupling groove 13 through guide grooves 14a (FIG. 1) when the coupling halves are coupled. Simultaneously, projections 33a of valve housing 33 engage into guide grooves 14a, so as to fix valve housing 33 against rotation.

Piston or stem-actuated valve 40 comprises a valve stem. 41 having a piston body 410 (FIG. 4) which is movable in the axial direction by means of a shifting link gear. The shifting link gear comprises a helical cam groove 38 in tubular portion 36 of drive housing 32 and a stem pin 42 in the form of a shaft that extends transversely to the stem and has rollers 420 on the ends of the shaft. Rollers 420 are guided in cam groove 38. In addition, the shifting link gear includes a stem longitudinal guide 39 on valve housing 33. A conical stopper 43 limits the displacement movement of valve stem 41 in the closed position of the valve, while the other end position which is the open position of the valve is defined by cam groove 38. Actuation of the shifting link gear is accomplished by a hand wheel 45 which allows to rotate drive housing 32.

Figure 4:
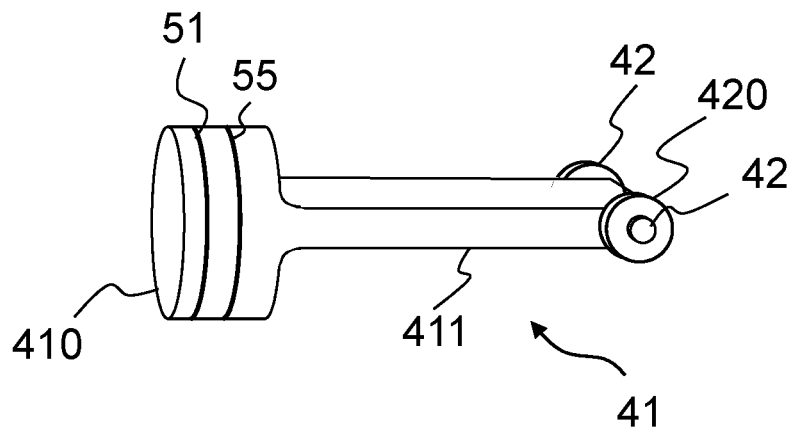
FIG. 4 illustrates a valve stem of the second coupling half.

FIG. 4 is a perspective view of an embodiment of valve stem 41. As can be seen from FIG. 4, valve stem 41 comprises a piston body 410 and a plate-shaped stem rod 411. Stem pin 42 extends in the center plane of plate-shaped stem rod 411 and transversely to the longitudinal extension of valve stem 41 at the end opposite to piston body 410. The plate-shaped implementation of the stem rod permits to gain flow space and enables a longitudinal guidance by stem longitudinal guide 39 when opening and closing stem-actuated valve 40.

Figure 3:
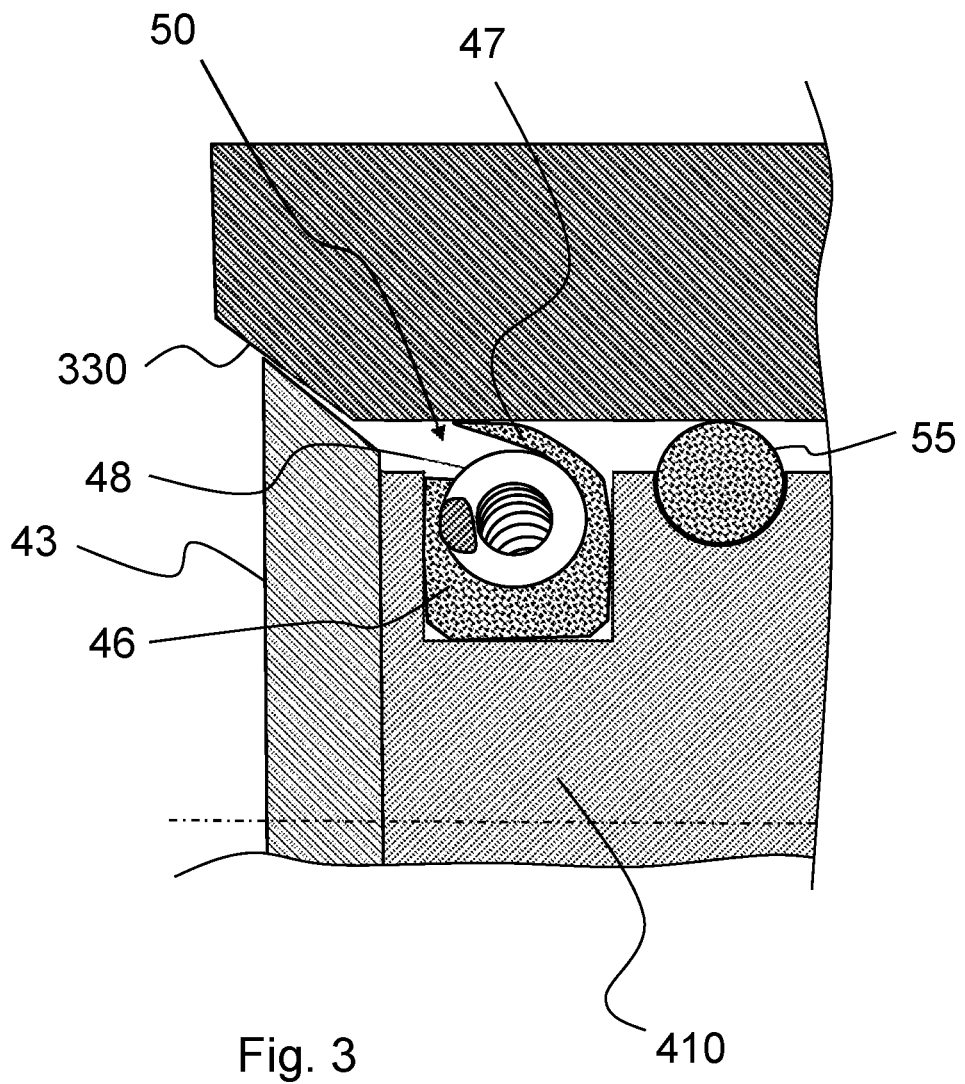
FIG. 3 is a longitudinal sectional view through a spreading lip seal.

FIG. 3 is a sectional view through a spreading lip seal 50 which comprises a sealing body 46 made of polytetrafluoroethylene or a PTFE-containing material or a similar material which is still elastic at low temperatures, whose radially outward projecting end forms a sealing lip 47, and a metallic helical spring 48 bent to form a ring, which presses sealing lip 47 against a smooth surface and thus seals a gap at the outer surface of spreading lip seal 50.

Such a spreading lip seal 51 in FIG. 2 may define a piston, alone or in cooperation with a ring seal 55, which represents the valve element of valve 40, or may serve as a piston seal for piston body 410. When piston body 410 is located in the valve bore the valve is closed, and when piston body 410 has been moved out of the valve bore the valve is opened. For facilitating to obtain the closed position, an insertion chamfer 330 for seals 51, 55 is provided at the entrance to the valve bore.

Housing 30 of the second coupling half has various axial annular gaps which are sealed by means of such spreading lip seals 50. First spreading lip seal 51 acts as a valve element of valve 40. A second spreading lip seal 52 serves to seal the annular gap between the front end of valve housing 33 and the annular inner surface 15a of housing 10 of the first coupling half 1. A third spreading lip seal 53 is inserted between the outer surface of the inner end of valve housing 33 and an inner annular surface of annular portion 35 of drive housing 32. A fourth spreading lip seal 54 is located in an axial annular gap between jacket housing 31 and drive housing 32 in the region of tubular portion 36. All these spreading lip seals ensure that moisture is kept away from the inside of the second coupling half as far as possible, and that, if ice should deposit there, the good sliding property of the seal ensures that the ice that has formed is detached already by a slight transverse force. In this way, sluggishness is avoided in case of the expected harsh operating conditions of the conduit coupling.

The conduit coupling is handled as follows:

Assuming that coupling half 1 is stationary fixed and that coupling half 2 is provided at the end of a hose. The annular housing portion 35 of second coupling half 2 is slid over flange 14 of the first coupling half 1, whereby the left end of valve housing 33 will enter annular space 15 of the first coupling half and coupling pins 37 will slide through guide grooves 14a until reaching coupling groove 13. Simultaneously, projections 33a of valve housing 33 will be introduced into guide grooves 14a of stationary housing 10.

Then, the two coupling halves are locked to each other by turning hand wheel 45. By further turning hand wheel 45, the shifting link gear is actuated, with valve stem 41 moving to the left in FIG. 2 and thereby abutting at the right end of valve disk 21 which is displaced to the left (FIG. 1) against the force of spring 23. In this way, a conical gap between seal 22 and valve seat 11a is opened, through which medium can flow. With the displacement of valve stem. 41 to the left in the drawing, piston body 410 together with spreading lip seal 51 and annular seal 55 moves out of the axial annular gap between valve housing 33 and valve stem 41, so as to allow the passage of medium through this annular gap. Depending on the pressure gradient, medium will flow from the first conduit to the first coupling half and from there through the second coupling half to the second conduit, or vice versa. Spreading lip seals 52, 53 and 54 ensure that no medium can escape to the outside.

In order to separate the coupling halves, hand wheel 45 is turned in the direction of backward movement of valve stem 41, with the ring seal 55 moving into the valve bore of the valve housing and thereby exactly axially aligning valve stem 41. Then, spreading lip seal 51 will enter the axial annular gap between valve housing 33 and stem 41 and seal this annular gap. The retraction movement of stem 41 is limited by conical stopper 43. Now, coupling pins 37 are aligned with guide grooves 14a in their circumferential position, so that second coupling half 2 can be removed from first coupling half 1. Stopper 43 is preferably formed as a molded part made of PTFE and is secured to valve stem 41.

Should ice have deposited in gaps because of the strong temperature gradient between inside and outside of the coupling, then the transverse forces applied to the deposited ice by turning hand wheel 45 will lead to a detachment of the ice film from sealing points lined with polytetrafluoroethylene or PTFE-containing material. Despite difficult external conditions, the device can be operated easily.

The invention claimed is:

1. A conduit coupling for connecting a first conduit to a second conduit to open or block a medium passage for low temperature media, comprising:
    a first coupling half arranged in a course of a first conduit, which comprises a first tubular housing with an outer coupling groove, and a poppet valve with a spring biased valve disk that normally blocks a medium passage but can be pushed open;
    a second coupling half arranged in a course of a second conduit, which comprises a second, three-part housing including a tubular jacket housing, a bell-shaped drive housing and a valve housing, and a stem-actuated valve including a valve stem and a valve piston that normally blocks said medium passage through an axial annular gap on the valve housing but clears said medium passage when being displaced by the drive housing, wherein the drive housing can take different rotational positions in order to engage and disengage coupling pins in the coupling groove and to rotate a cam groove to thereby drive a stem pin of the valve stem and the valve stem to open or close the stem-actuated valve, and to actuate the poppet valve of the first coupling half; and
    a first spreading lip seal which, as an element of the valve piston, opens or closes the axial annular gap between the valve housing and the valve stem depending on the position of the drive housing.

2. The conduit coupling of claim 1, wherein the first tubular housing comprises a radial coupling flange having a first axial annular inner surface, and wherein the valve housing of the second coupling half comprises a first axial flange end which has a second spreading lip seal cooperating with the first axial annular inner surface of the first coupling half when the conduit coupling is connecting the first conduit to the second conduit.

3. The conduit coupling of claim 1, wherein the bell-shaped drive housing comprises a second axial annular inner surface, and wherein the valve housing comprises a second axial flange end which has a third spreading lip seal that cooperates with the second axial annular inner surface.

4. The conduit coupling of claim 1, wherein the jacket housing of the second coupling half comprises a third axial annular inner surface, and wherein the drive housing of the second coupling half comprises an outer annular surface having a fourth spreading lip seal which cooperates with the third axial annular inner surface of the jacket housing.

5. The conduit coupling of claim 1, wherein a ring seal is arranged on the valve piston in parallel to the first spreading lip seal.

6. The conduit coupling of claim 1, wherein the valve disk of the first coupling half has a conical pressing lip seal.

7. The conduit coupling of claim 1, wherein a hand wheel is mounted on the bell-shaped drive housing of the second coupling half for locking the coupling halves by engaging the coupling pins in the coupling groove and by rotating the drive housing with respect to the first tubular housing.

8. The conduit coupling of claim 1, wherein the cam groove is a helical groove.

9. The conduit coupling of claim 1, wherein the stem pin is formed as a shaft provided with rollers, which is arranged transversely to the motion direction of the valve stem.

10. The conduit coupling of claim 1, wherein the bell-shaped drive housing has a ring portion of a larger diameter and a tubular portion of a smaller diameter.

11. The conduit coupling of claim 1, wherein friction reducing linings are provided in a region of at least one of annular gaps between device elements that are movable relative to each other.

12. The conduit coupling of claim 11, wherein the friction reducing linings comprise coatings containing polytetrafluoroethylene.

13. The conduit coupling of claim 1, wherein the first tubular housing of the first coupling half includes a thermal barrier coating.

14. The conduit coupling of claim 10, wherein the bell-shaped drive housing has each a thermal barrier coating on an inner surface of the ring portion and on an outer surface of the tubular portion.

* * * * *